US012353973B2

(12) United States Patent
Lin et al.

(10) Patent No.: US 12,353,973 B2
(45) Date of Patent: Jul. 8, 2025

(54) FEDERATED LEARNING

(71) Applicant: International Business Machines Corporation, Armonk, NY (US)

(72) Inventors: Hui Lin, Beijing (CN); Jun Yang, Beijing (CN); Peng Fei Tian, Beijing (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 17/478,196

(22) Filed: Sep. 17, 2021

(65) Prior Publication Data

US 2023/0093067 A1    Mar. 23, 2023

(51) Int. Cl.
    *G06N 20/00*    (2019.01)
    *G06N 20/20*    (2019.01)
(52) U.S. Cl.
    CPC ................... *G06N 20/20* (2019.01)
(58) Field of Classification Search
    CPC .................................................. G06N 20/20
    See application file for complete search history.

(56) References Cited

U.S. PATENT DOCUMENTS

| | | | |
|---|---|---|---|
| 2019/0042937 A1* | 2/2019 | Sheller | G06N 3/08 |
| 2019/0050749 A1 | 2/2019 | Sanketi | |
| 2021/0119901 A1* | 4/2021 | Balakrishnan | H04L 47/32 |
| 2022/0164661 A1* | 5/2022 | Uehara | G06N 3/044 |

FOREIGN PATENT DOCUMENTS

CN    112183652 A    1/2021

OTHER PUBLICATIONS

Anonymous. "Real-Life Use Cases for Edge Computing." Printed Jul. 12, 2021. 9 pages. Published by IEEE. https://innovationatwork.ieee.org/real-life-edge-computing-use-cases/.
Du, et al., "Fairness-aware Agnostic Federated Learning." Published Oct. 10, 2020. 12 pages. Published by ARXIV. https://arxiv.org/abs/2010.05057.
Goasduff, "Gartner Predicts Outdoor Surveillance Cameras Will Be Largest Market for 5G Internet of Things Solutions Over Next Three Years." Published Oct. 17, 2019. 2 pages. Published by Gartner. https://www.gartner.com/en/newsroom/press-releases/2019-10-17-gartner-predicts-outdoor-surveillance-cameras-will-be.
Guo, et al., "PFL-MoE: Personalized Federated Learning Based on Mixture of Experts." Published Dec. 31, 2020. 10 pages. Published by ARXIV. https://arxiv.org/abs/2012.15589.
McMahan, et al., "Communication-Efficient Learning of Deep Networks from Decentralized Data." Published Feb. 28, 2017 by ARXIV. 11 pages. https://arxiv.org/pdf/1602.05629.pdf.

(Continued)

*Primary Examiner* — Nhat Huy T Nguyen
(74) *Attorney, Agent, or Firm* — Joseph P. Curcuru

(57) ABSTRACT

A processor may receive local updates for a current global model from a plurality of client computing devices, each local update being determined by one of the plurality of client computing devices based on a local dataset on the client computing device. The processor may determine a domain-specific aggregate of the local updates from each subset of the plurality of client computing devices. The processor may determine an updated global model based on the domain-specific aggregate of the local updates for each subset of the plurality of client computing devices.

20 Claims, 9 Drawing Sheets

(56) References Cited

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Talluri, "Why edge computing is critical for the IoT." Published Oct. 24, 2017. 6 pages. Published by Network World. https://www.networkworld.com/article/3234708/why-edge-computing-is-critical-for-the-iot.html.

* cited by examiner

FEDERATED LEARNING

BACKGROUND

The present disclosure relates generally to the field of machine learning, and more specifically, to federated learning.

In recent years, machine learning has been increasingly used to solve a number of problems. Federated learning is a machine learning framework that enables training of a high-quality, centralized model based on training data distributed over a large number of client computing devices. In federated learning, the training data can be kept locally on various client computing devices and such client computing devices can be used as nodes for performing computation on their local data in order to update a global model.

SUMMARY

Embodiments of the present disclosure include a method, computer program product, and system for federated learning. According to some embodiments of the present disclosure, there is provided a computer-implemented method. The method comprises receiving, by at least one server computing device, local updates for a current global model from a plurality of client computing devices, each local update being determined by one of the plurality of client computing devices based on a local dataset on the client computing device; determining, by the at least one server computing device, a domain-specific aggregate of the local updates from each subset of the plurality of client computing devices; and determining, by the at least one server computing device, an updated global model based on the domain-specific aggregate of the local updates for each subset of the plurality of client computing devices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
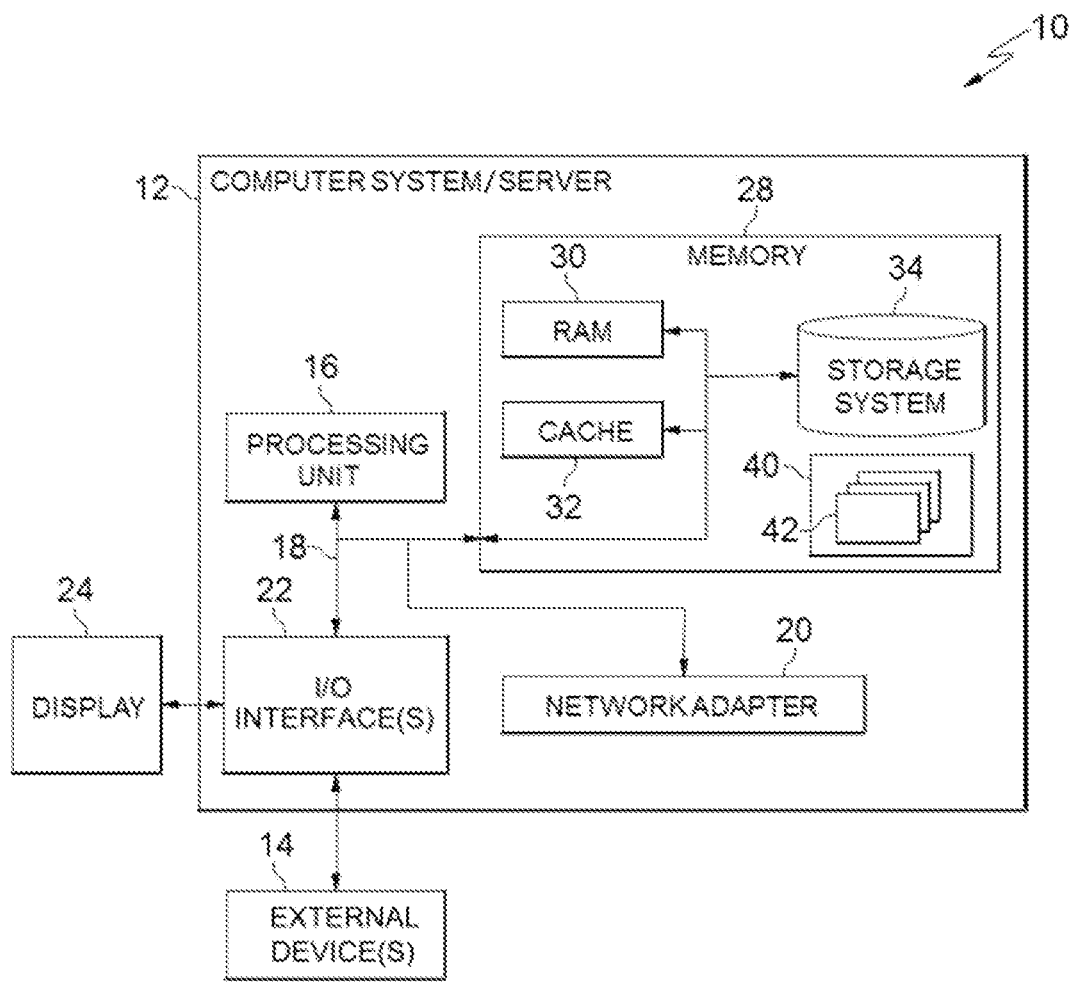
FIG. 1 depicts a cloud computing node in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of machine learning, and more specifically, to federated learning. While the present disclosure is not necessarily limited to such applications, various aspects of the disclosure may be appreciated through a discussion of various examples using this context.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
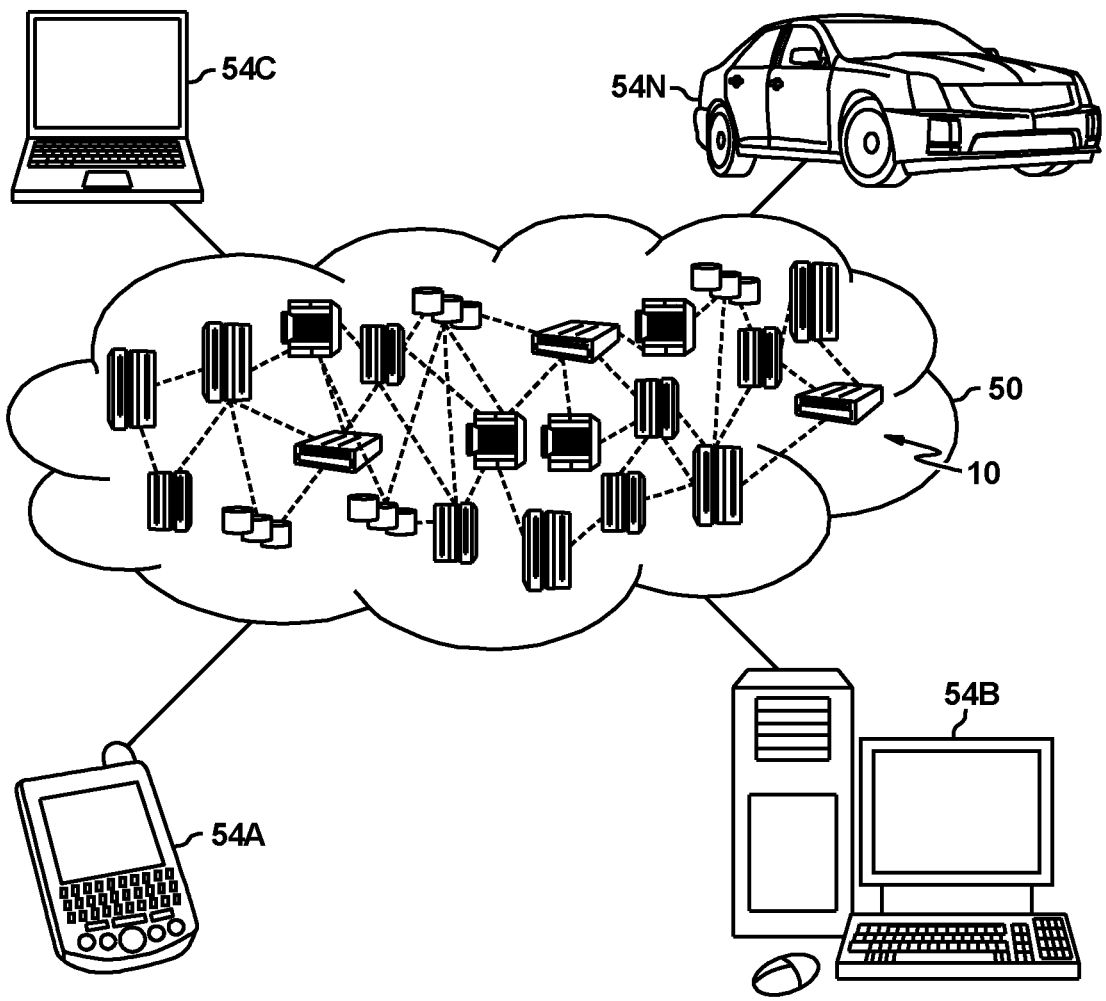
FIG. 2 depicts a cloud computing environment in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
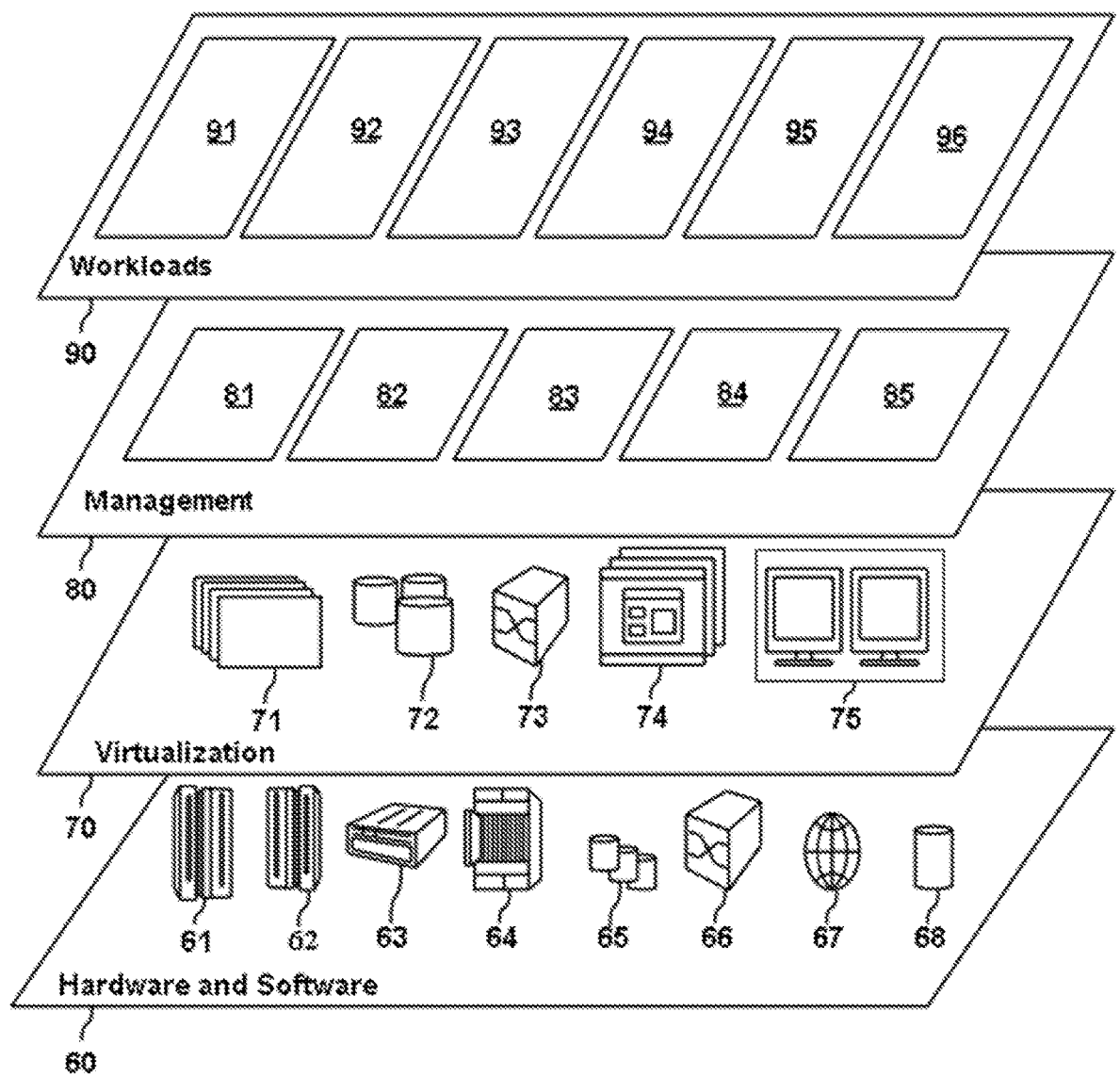
FIG. 3 depicts abstraction model layers in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated learning 96.

In federated learning, a client computing device determines a local update to a model based on locally stored data and then communicates the local update to a cloud service (e.g., in a privacy preserving and communication efficient manner) for aggregation to generate a global update to the model. However, some of the client computing devices may not contribute to the training of the global model, which results in an unfairness problem. In addition, the model trained by federated learning may also lack personalization.

Figure 4:
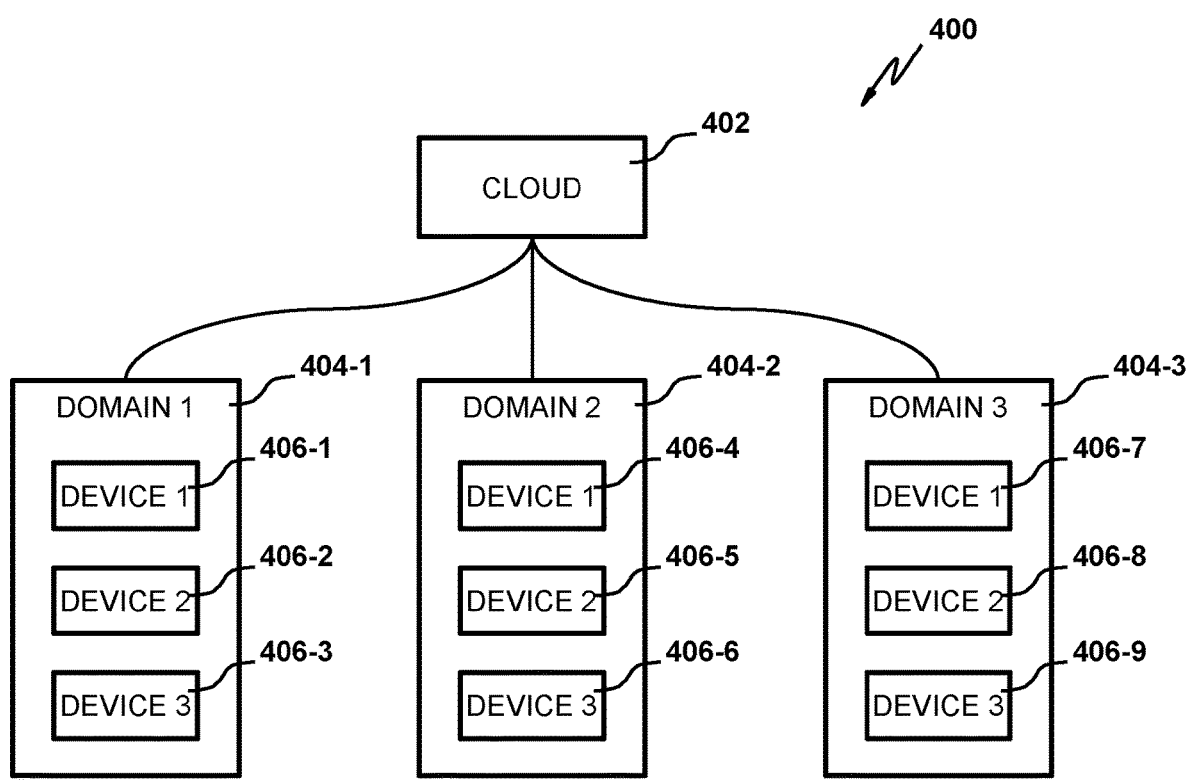
FIG. 4 depicts an example system for federated learning in accordance with some embodiments of the present disclosure.

With reference now to FIG. 4, an example system 400 for federated learning in accordance with some embodiments of the present disclosure is depicted. The system 400 may be configured to train a machine learning model using local datasets or training data stored locally on a plurality of client computing devices 406-1 to 406-9 (collectively referred to as client computing devices 406). The system 400 can further include a cloud service 402 implemented by one or more server computing devices (not shown). The cloud service 402 may be configured to access a machine learning model and to provide the model to the plurality of client computing devices 406. The model can be, for example, a linear regression model, a logistic regression model, a support vector machine model, a neural network (e.g. convolutional neural network, recurrent neural network, etc.), or another suitable model. In some embodiments, the cloud service 402 can be configured to communicate with the client computing devices over one or more networks (not shown).

The client computing devices 406 may each be configured to determine one or more local updates associated with the model based on a local dataset. For example, the local dataset can be data stored locally on the client computing devices 406. For example, the local dataset can include audio files, image files, video files, textual files, and/or various other suitable data. For example, the client computing devices 406 may include cameras configured to detect fire accidents.

In some embodiments, the local updates can be a gradient vector associated with the model. For example, the client computing devices 406 can determine a gradient associated with the model based on local datasets respectively stored on the client computing devices 406. It is to be understood that the local updates may include any suitable data indicative of one or more local training techniques respectively performed by the client computing devices based on the local datasets. In some embodiments, the local updates can include one or more training passes or epochs. In this way, the minibatch of training data in the local datasets can be applied one or more times to determine the local update.

The client computing devices 404 can then be configured to provide the local updates to the cloud service 402. For example, the local dataset may not be provided to the cloud service. The local update does not include training data. The cloud service 402 can receive each local update from the client computing devices 406 and can aggregate the local updates to determine a global update to the model. In some embodiments, the cloud service 402 can determine a weighted average of the local updates and determine the global update based on the weighted average of the local updates. It is to be noted that various techniques can be applied without deviating from the scope of the present disclosure.

Part of the client computing devices 406 may have the same or similar performances and share the same or similar feature space. Due to the nature of similarity, this part of the client computing devices 406 may suffer the same or similar problems, which causes the feature space of the model to be incomplete. In this case, the machine-learned model may not consider the local updates on this part of client computing devices. For example, the client computing devices may be cameras installed in factory buildings to detect fire accidents in factories. The feature space of the model may lack the environment of factory and the machine-learned model may not be deployed to make accurate prediction for the factories.

The client computing devices 406 may be separated into a plurality of domains or subsets, where each domain or subset of client computing devices may have the same or similar characteristics or features. As shown in FIG. 4, the first domain 404-1 may include a number of client computing devices 406-1 to 406-3, the second domain 404-2 may include a number of client computing devices 406-4 to 406-6, and the third domain 404-3 may include a number of client computing devices 406-7 to 406-9. For example, the client computing devices 406-1 to 406-3 can be cameras installed in factory buildings and may have the same or similar computing and network performance. The client computing devices 406-1 to 406-3 in the first domain 404-1 may suffer the same fault or problem, for example, network congestion. By separating the client computing devices 406 into a plurality of subsets, the cloud service 402 may process the local updates from each domain in a domain-specific manner. For example, if network congestion is a major factor affecting the first domain 404-1, the cloud service 402 may allocate more network resources to communicate with the first domain 404-1 to improve network congestion for the first domain 404-1. As a result, the unfairness problem of the federated learning can be mitigated or relaxed.

In some embodiments, the cloud service 402 may have an abstraction layer for implementing the domain layer. For example, in the domain layer, the server computing devices may be configured to receive and aggregate the local updates from each of the first domain 404-1 to the third domain 404-3. In another example, one or more of the server computing devices may be configured to receive and aggregate the local updates from the first domain 404-1, one or more of the server computing devices may be configured to receive and aggregate the local updates from the second domain 404-2, and one or more of the server computing devices may be configured to receive and aggregate the local updates from the third domain 404-3.

Figure 5:
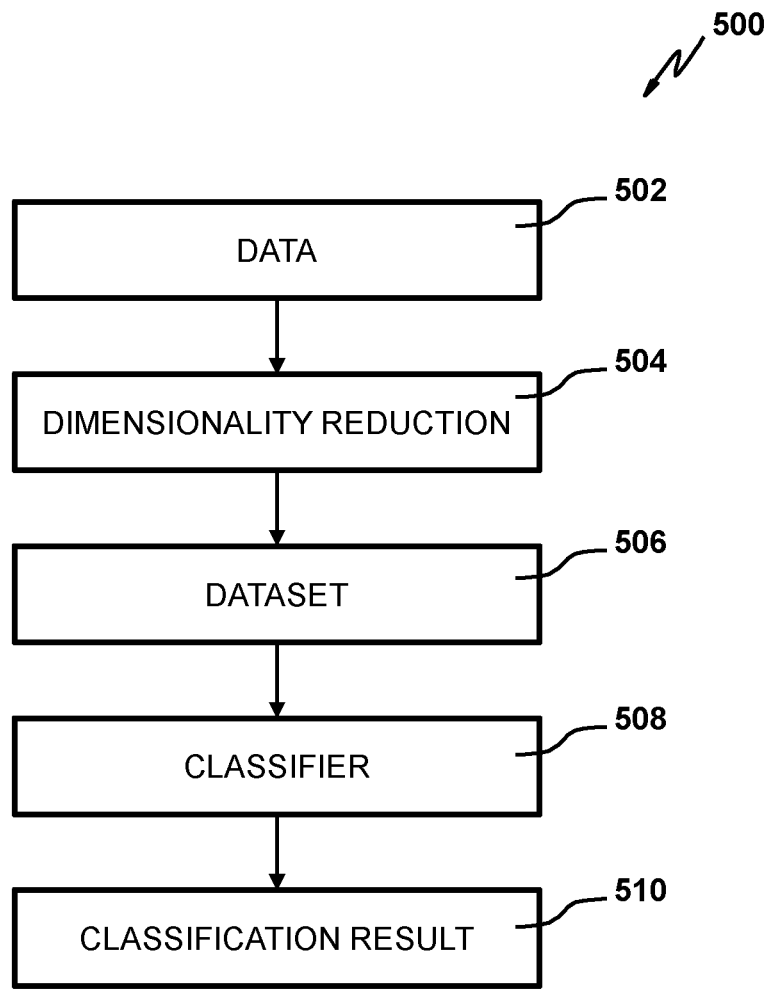
FIG. 5 depicts an example method for classifying the client computing devices in accordance with some embodiments of the present disclosure.

FIG. 5 depicts an exemplary method 500 for determining the subsets or domains of the client computing devices in accordance with some embodiments of the present disclosure. The method 500 may be implemented by the cloud service 402, for example.

At block 502, the cloud service 402 may obtain characteristic data representing the client computing devices 406. For example, the characteristic data may include the location, organization, etc. There may be a very high number of the client computing devices, and thus the characteristic data may have a very high dimension. At block 504, the dimension of the characteristic data may be reduced to obtain a new dataset 506. For example, the characteristic data may be represented by $$X_{mn} = \begin{bmatrix} x_{11} & \cdots & x_{1n} \\ \vdots & \ddots & \vdots \\ x_{m1} & \cdots & x_{mn} \end{bmatrix} = [c_1, c_2, \ldots \ldots, c_n].$$

A covariance matrix may be calculated by:

$$Cov_{nn} = \begin{bmatrix} c_{11} & \cdots & c_{1n} \\ \vdots & \ddots & \vdots \\ c_{n1} & \cdots & c_{nn} \end{bmatrix}.$$

The eigenvalues of the eigenvectors may be ranked and the characteristics having top K characteristic values may be selected:

$$M_{nk} = \begin{bmatrix} c_{11} & \cdots & c_{1k} \\ \vdots & \ddots & \vdots \\ c_{n1} & \cdots & c_{nk} \end{bmatrix}.$$

The matrix $X_{mn}$ and $M_{nk}$ may be multiplied to obtain a new dataset as follows:

$$D_{mk} = X_{mn} * M_{nk} = \begin{bmatrix} d_{11} & \cdots & d_{1k} \\ \vdots & \ddots & \vdots \\ d_{k1} & \cdots & d_{mk} \end{bmatrix}.$$

The dataset 506 may be provided to the classifier 508 to determine a classification result 510, where each client computing device is classified into a domain or subset of client computing devices. By dimensionality reduction, the computation overhead may be reduced and the computing efficiency may be improved.

In some embodiments, clustering may be used in the classifier 508. Clustering is the task of grouping a set of objects in such a way that objects in the same group (called a cluster) are more similar (in some sense) to each other than to those in other groups (clusters). Each cluster may have a center or centroid, which may be initialized randomly.

Figure 6:
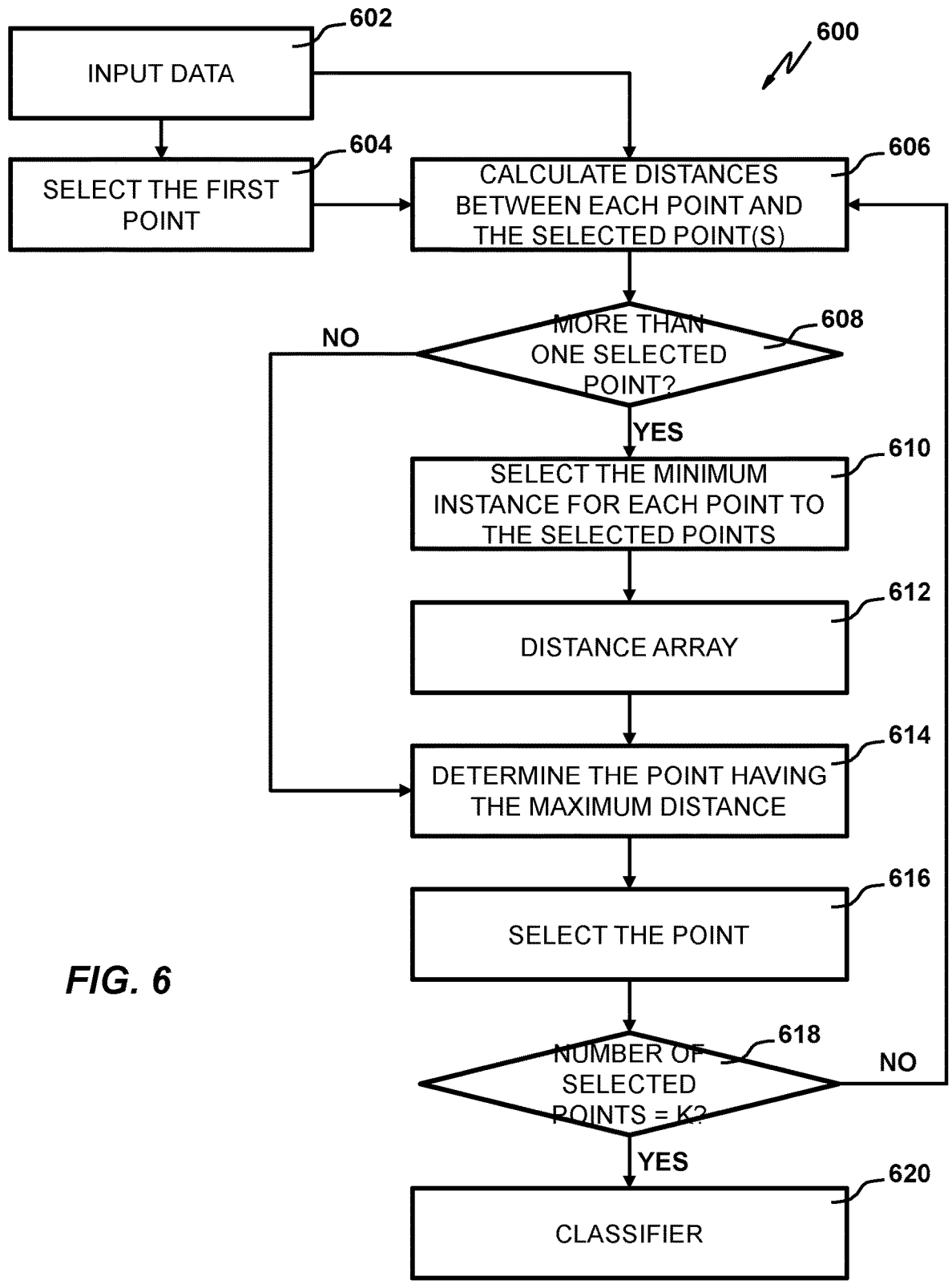
FIG. 6 depicts an example method for centroid initialization in accordance with some embodiments of the present disclosure.

Clustering may be sensitive to the initialization of the centroids. So, if a centroid is initialized to be a "far-off" point, it might just end up with no points associated with it, and at the same time, more than one cluster might end up linked with a single centroid. FIG. 6 depicts a flowchart of an example method 600 for centroid initialization in accordance with some embodiments of the present disclosure.

The input data 602 may include a number of points, where each point may represent a client computing device. Each point may be a vector in a vector space, for example. At block 604, a first point may be randomly selected from the input data 602. At block 606, the distances between the selected first point and each other point in the input data 602 are calculated. The distance may be a Euclidean distance or any other suitable distance. At block 608, it is determined whether the number of the selected point(s) is greater than one. If it is determined at block 608 that the number of the selected point(s) is one, the method 600 proceeds to block 614. At block 614, it is determined the point that has the maximum distance from the selected point. At block 616, the point is selected. At block 618, it is determined whether the number of the selected points equals a predetermined number K. If it is determined at block 618 that the number of the selected points equals K, the selected points may be provided as the initialized centroids to the classifier 620 for classification.

If it is determined at block 608 that the number of the selected point(s) is more than one, the method 600 proceeds to block 610. At block 610, the minimum distance between each point and the selected points is selected to generate a distance array 612. At block 614, it is determined that the point that has the maximum distance in the distance array 612. At block 616, the point that has the maximum distance in the distance array 612 is selected. If it is determined at block 618 that the number of the selected points does not equal K, the method 600 returns to block 606.

Centroid initialization may pick up centroids that are far away from one another. This increases the chances of initially picking up centroids that lie in different clusters.

Referring back to FIG. 4, the cloud service 402 may maintain a plurality of queues for storing the local updates received from the client computing devices. One or more client computing devices may have a low computing performance and thus may always be late for calculating the local update in time. In this case, the local update of the client computing devices may always be abandoned by the cloud service 402 when training the global model. In some embodiments, the cloud service 402 may store a local update from a client computing device 406 when the cloud service 402 receives the local update from the client computing device 406. For example, the cloud service 402 may store the local update from each client computing device 406 in a respective queue. The cloud service 402 will then retrieve one or more local updates from the queue for model training. For example, the cloud service 402 may retrieve only one local update or all the local updates from the queue when training the global model. In this case, even if a local update is late for a training pass or epoch, the local update will not be abandoned but will be saved in the queue for use in a subsequent training pass or epoch.

Figure 7:
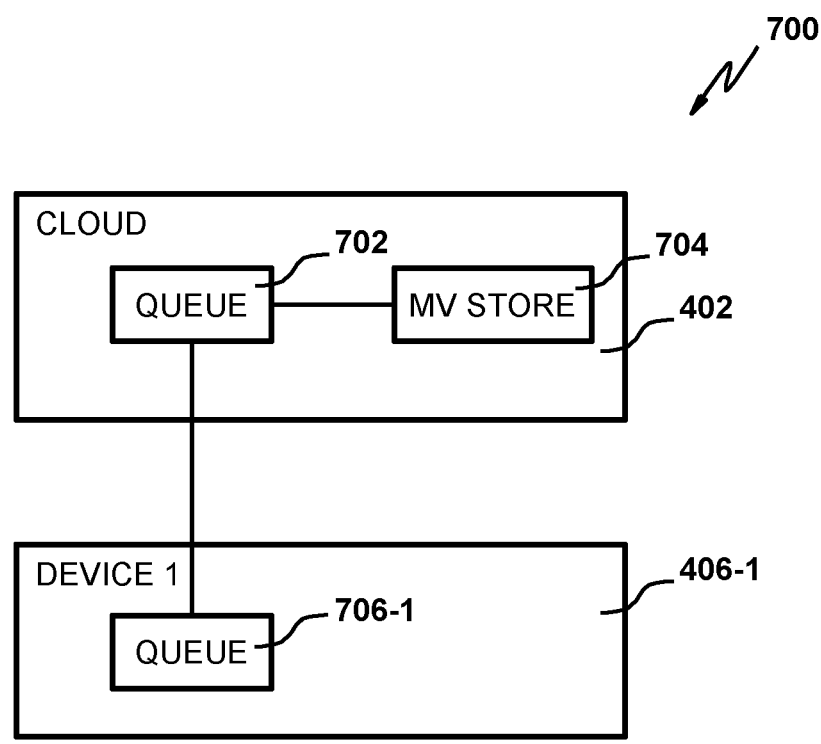
FIG. 7 depicts an example method for model update in accordance with some embodiments of the present disclosure.

FIG. 7 depicts an example method 700 for updating the model combining the concepts of queues and multiple version control in accordance with some embodiments of the present disclosure. It is noted that there is only one client computing device illustrated and the method 700 can be applied for any other client computing device. The client computing device 406-1 may maintain a queue 706-1 for storing local updates that have been calculated by the client computing device 406-1 before sending to the cloud service 402. For example, if there is any network congestion between the client computing device 406-1 and the cloud service 402, the local updates may not be discarded but may be stored in the queue 706-1.

The client computing device 406-1 may provide the local updates from the queue 706-1 to the cloud service 402. In particular, the cloud service 402 may maintain a queue 702 for the client computing device 406-1 and store the received local update(s) from the client computing device 406-1. For example, when the network congestion between the client computing device 406-1 and the cloud service 402 improves, a plurality of local updates stored in the queue 706-1 may be provided and stored into the queue 702. In this situation, the cloud service 402 may retrieve one of the plurality of local updates from the queue 702 epoch by epoch. In this way, all the local updates from the client computing device 406-1 will be considered and the fairness of the model training may be substantially improved.

In some embodiments, when the cloud service 402 retrieves a local update from the queue 702, it will remove the local update from the queue 702 and store the removed local update in the multi-version (MV) store 704 as a historical version of the local update. If the queue 702 is empty in the next pass or epoch, the cloud service 402 may retrieve the historical version of the local update from the MV store for model training. By taking into account of the historical version of the local update, the method can further improve the fairness of the model training.

Figure 8:
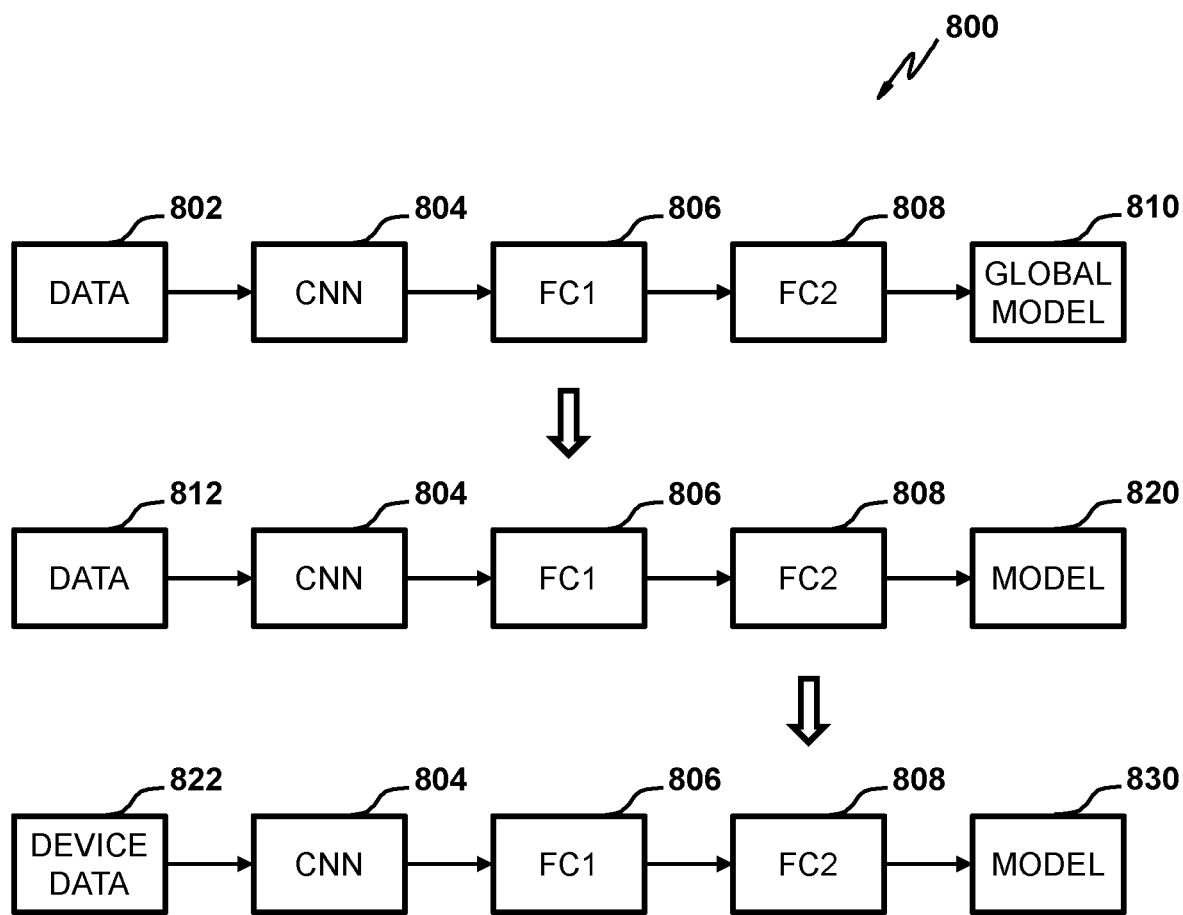
FIG. 8 depicts a method for model personalization in accordance with some embodiments of the present disclosure.

FIG. 8 depicts an example method 800 for providing one or more personalized models in accordance with some embodiments of the present disclosure. The model may include a first portion, a second portion, and a third portion. In this example, the model is a neural network, the first portion is a Convolutional Neural Network (CNN) 804, the second portion is a fully-connected (FC) layer 806, and the third portion is another FC layer 808. The CNN 800 may include a number of convolutional layers and pooling layers. It is to be noted that the CNN 804 and FC layers 806 and 808 are mainly provided for illustrative purpose and any other suitable model portions can be applied without deviating from the scope of the present disclosure.

In federated learning, the training data 802 from the client computing devices may be used to train a global model 810. With reference to FIG. 4, the cloud service 402 may receive local updates for a current global model from the plurality of client computing devices 406. Each local update may be determined by a respective one of the plurality of client computing devices based on a local dataset on the respective client computing device. The cloud service 402 may determine a domain-specific aggregate of the local updates from each subset of the plurality of client computing devices. The cloud service 402 may determine an updated global model based on the domain-specific aggregate of the local updates for each subset of the plurality of client computing devices. In this way, the global model 810 may be obtained.

The client computing devices may be different from one another and may be deployed for different purposes. The global model 810 may not be personalized for each of the client computing devices. For example, the global model 810 may be suitable for a first client computing device but not suitable for a second client computing device. For example, the global model 810 may be suitable for client computing devices in a first domain but not suitable for client computing devices in a second domain.

As shown in FIG. 8, an additional domain-level federated learning may be implemented. For example, the data 812 may include the local datasets on the client computing devices in one of the domains. The data 812 may be used to train the second portion of the model (the FC layer 806 in this example) by freezing the remaining of the model (the CNN 804 and the FC layer 808 in this example). In this way, a domain-specific model 820 may be obtained. For example, the cloud service 402 may receive further local updates for the FC layer 806 of the global model 810 from a subset of the plurality of client computing devices. Each further local update may be determined by a respective one of the subset of client computing devices based on the local dataset on the respective client computing device. The cloud service 402 may determine a domain-specific model 820 for the first subset of client computing devices by updating the FC layer 818 of the global model 810 based on the further local updates.

In some embodiments, transfer learning or domain adaptation may be implemented to obtain the domain-specific model 820. For example, correlation alignment for deep domain adaptation (also referred to as Deep CORAL) may be used to train the domain-specific model 820. For example, the following CORAL loss function may be used when implementing domain adaptation:

$$\ell_{CORAL} = \frac{1}{4d^2}\|C_S - C_T\|_F^2$$

where $\|\cdot\|_F^2$ denotes the squared matrix Frobenius norm, d denotes the dimension of the features, $C_S$ and $C_T$ are the covariance matrices of the source data (for example, data 802) and target data (for example, data 812).

In addition, the local dataset on a client computing device, also referred to as device data 822, may be used to train the model 820 by freezing the CNN 804 and the FC layer 806. In this way, a device-specific model 830 may be obtained. For example, the client computing device in the domain may determine a device-specific model for the first client computing device by updating the FC layer 808 of the domain-specific model based on the local dataset on the first client computing device. Similar to the FC layer 806, the FC layer 808 may also be updated by transfer learning or domain adaptation.

In some embodiments, the transfer learning may be represented by:

$$\operatorname*{argmin}_{\Theta} \mathcal{L} = \sum_{i=1}^{n} \ell(y_i, f_s(X_i)) + \eta \ell_{CORAL}$$

where $\mathcal{L}$ denotes the loss function, $\ell(\cdot,\cdot)$ denotes the loss for the neural network (for example, cross-entropy loss), $\{X_i, y_i\}_{i=1}^n$ denote the training data on the client computing devices, n denotes the number of the client computing devices, fs denotes the model, $\Theta$ denotes all the parameters to be learned (for example, the weights and biases), and $\eta$ denotes the tradeoff parameter.

The convolutional layers are used to extract low-level features about activity recognition. By freezing the convolutional layers and the pooling layers, the parameters of the layers will not be updated in backpropagation. The FC layers 806 and 808 focus on learning specific features for the domain and client computing devices.

Figure 9:
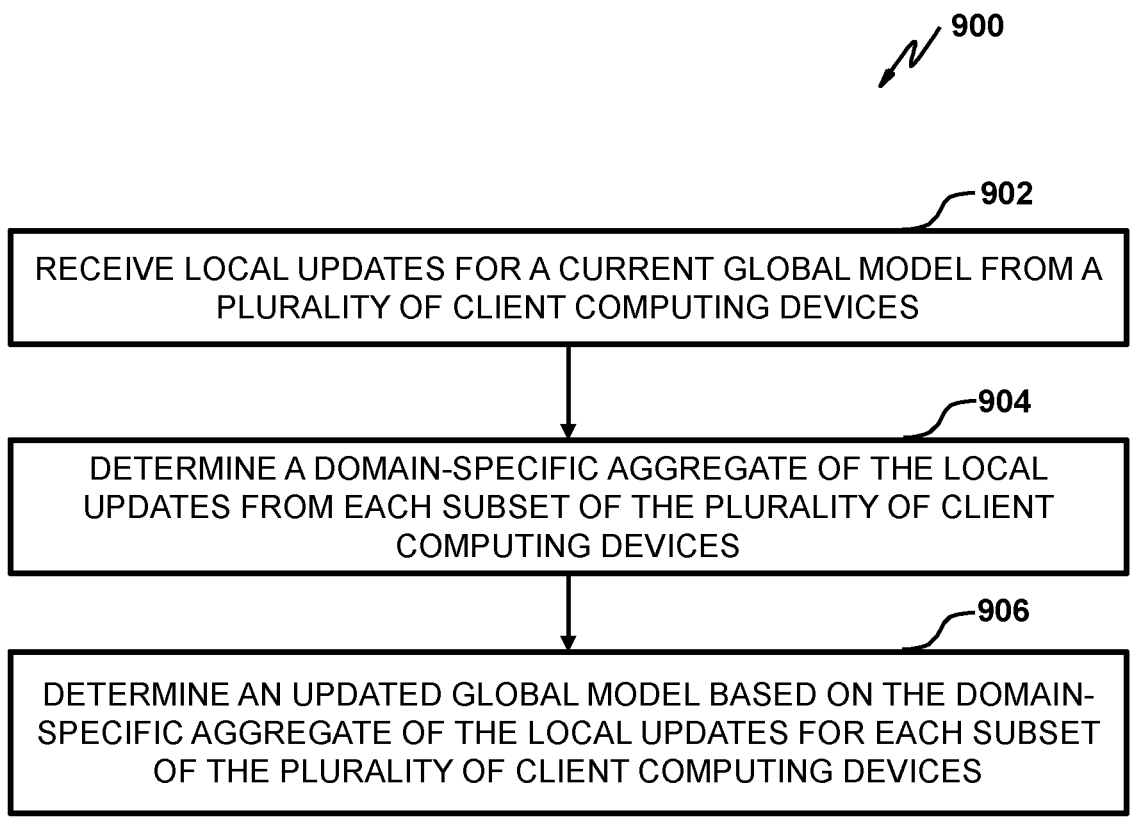
FIG. 9 depicts a method for federated learning in accordance with some embodiments of the present disclosure.

FIG. 9 depicts a flowchart illustrating an example method 900 for federated learning in accordance with some embodiments of the present disclosure.

At block 902, at least one server computing device may receive local updates for a current global model from a plurality of client computing devices, each local update being determined by one of the plurality of client computing devices based on a local dataset on the client computing device.

At block 904, the at least one server computing device may determine a domain-specific aggregate of the local updates from each subset of the plurality of client computing devices.

At block 906, the at least one server computing device may determine an updated global model based on the domain-specific aggregate of the local updates for each subset of the plurality of client computing devices.

In some embodiments, the method 900 further comprises receiving, by the at least one server computing device, further local updates for a first portion of the updated global model from a first subset of the plurality of client computing devices, each further local update being determined by a respective one of the first subset of client computing devices based on the local dataset on the respective client computing device; and determining, by the at least one server computing device, a domain-specific model for the first subset of client computing devices by updating the first portion of the global model based on the further local updates.

In some embodiments, the method 900 further comprises determining, by a first client computing device among the first subset of client computing devices, a device-specific model for the first client computing device by updating a second portion of the domain-specific model based on the local dataset on the first client computing device.

In some embodiments, the method 900 further comprises obtaining, by the at least one server computing device, characteristic data representing the plurality of client computing devices; and classifying, by the at least one server computing device, the plurality of client computing devices based on the characteristic data into a plurality of subsets of client computing devices.

In some embodiments, classifying the plurality of client computing devices comprises: reducing, by the at least one server computing device, a dimension of the characteristic data representing the plurality of client computing devices; and classifying, by the at least one server computing device, the plurality of client computing devices based on the dimension-reduced characteristic data.

In some embodiments, classifying the plurality of client computing devices comprises: initializing, by the at least one server computing device, centers among the plurality of client computing devices based on distances of the characteristic data among the plurality of client computing devices; and classifying, by the at least one server computing device, the plurality of client computing devices based on the centers among the plurality of client computing devices to obtain subsets of the plurality of client computing devices.

In some embodiments, the method 900 further comprises storing, by the at least one server computing device, a historical version of the local update from each of the plurality of client computing devices; and in response to failing to receive a local update from one of the plurality of client computing device, retrieving, by the at least one server computing device, the historical version of the local update from the client computing device, wherein determining the domain-specific aggregate of the local updates comprises determining the domain-specific aggregate of the local updates based at least in part on the historical version of the local update from the client computing device.

In some embodiments, the method 900 further comprises storing, by the at least one server computing device, the local update from each of the plurality of client computing devices in a respective queue; and retrieving, by the at least one server computing device, the local update from the respective queue for the client computing device.

It should be noted that the processing of federated learning according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the last, scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It should be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
maintaining a plurality of queues for storing local updates;
receiving, by at least one server computing device, the local updates epoch by epoch for a current global model from a plurality of client computing devices, each local update being determined by one of the plurality of client computing devices based on a local dataset on the client computing device, wherein retrieving the local updates from the plurality of queues comprises:
removing a local update from the queue and storing the removed local update in a multi-version (MV) store as a historical version of the local update;
responsive to the plurality of queues being empty in the next epoch, retrieving a historical version of the local update from the MV store for model training;
determining, by the at least one server computing device, a domain-specific aggregate of the local updates from each subset of the plurality of client computing devices; and
determining, by the at least one server computing device, an updated global model based on the domain-specific aggregate of the local updates for each subset of the plurality of client computing devices.

2. The method of claim 1, further comprising:
receiving, by the at least one server computing device, further local updates for a first portion of the updated global model from a first subset of the plurality of client computing devices, each further local update being determined by a respective one of the first subset of client computing devices based on the local dataset on the respective client computing device; and
determining, by the at least one server computing device, a domain-specific model for the first subset of client computing devices by updating the first portion of the global model based on the further local updates.

3. The method of claim 2, further comprising:
determining, by a first client computing device among the first subset of client computing devices, a device-specific model for the first client computing device by updating a second portion of the domain-specific model based on the local dataset on the first client computing device, wherein the local dataset is used to train a second portion of the global model by freezing the remaining portion of the global model.

4. The method of claim 1, further comprising:
obtaining, by the at least one server computing device, characteristic data representing the plurality of client computing devices; and
classifying, by the at least one server computing device, the plurality of client computing devices based on the characteristic data into a plurality of subsets of client computing devices.

5. The method of claim 4, wherein classifying the plurality of client computing devices comprises:
reducing, by the at least one server computing device, a dimension of the characteristic data representing the plurality of client computing devices; and
classifying, by the at least one server computing device, the plurality of client computing devices based on the dimension-reduced characteristic data.

6. The method of claim 4, wherein classifying the plurality of client computing devices comprises:
initializing, by the at least one server computing device, centers among the plurality of client computing devices based on distances of the characteristic data among the plurality of client computing devices; and
classifying, by the at least one server computing device, the plurality of client computing devices based on the centers among the plurality of client computing devices to obtain subsets of the plurality of client computing devices, wherein classifying comprises clustering a set of objects so that the objects in the same group are more similar to each other than objects in other groups, wherein a cluster has a centroid that is initialized randomly.

7. The method of claim 1, further comprising at least one of:
storing, by the at least one server computing device, the local update from each of the plurality of client computing devices in a respective queue; or
retrieving, by the at least one server computing device, the local update from the respective queue for the client computing device.

8. A system comprising:
at least one server computing device comprising:
a memory; and
a processor in communication with the memory, the processor being configured to perform operations comprising:
maintaining a plurality of queues for storing local updates;
receiving, by at least one server computing device, the local updates epoch by epoch for a current global model from a plurality of client computing devices, each local update being determined by one of the plurality of client computing devices based on a local dataset on the client computing device, wherein retrieving the local updates from the plurality of queues comprises:
removing a local update from the queue and storing the removed local update in a multi-version (MV) store as a historical version of the local update;
responsive to the plurality of queues being empty in the next epoch, retrieving a historical version of the local update from the MV store for model training;
determining, by the at least one server computing device, a domain-specific aggregate of the local updates from each subset of the plurality of client computing devices; and
determining, by the at least one server computing device, an updated global model based on the domain-specific aggregate of the local updates for each subset of the plurality of client computing devices.

9. The system of claim 8, wherein the processor is further configured to perform operations comprising:
receiving further local updates for a first portion of the updated global model from a first subset of the plurality of client computing devices, each further local update being determined by a respective one of the first subset of client computing devices based on the local dataset on the respective client computing device; and
determining a domain-specific model for the first subset of client computing devices by updating the first portion of the global model based on the further local updates.

10. The system of claim 9, further comprising:
the plurality of client computing devices, wherein the plurality of client computing devices comprise a first client computing device among the first subset of client computing devices configured to determine a device-specific model for the first client computing device by updating a second portion of the domain-specific model based on the local dataset on the first client computing device.

11. The system of claim 8, wherein the processor is further configured to perform operations comprising:
obtaining characteristic data representing the plurality of client computing devices; and
classifying the plurality of client computing devices based on the characteristic data into a plurality of subsets of client computing devices.

12. The system of claim 11, wherein classifying the plurality of client computing devices comprises:
reducing a dimension of the characteristic data representing the plurality of client computing devices; and
classifying the plurality of client computing devices based on the dimension-reduced characteristic data.

13. The system of claim 11, wherein classifying the plurality of client computing devices comprises:
initializing centers among the plurality of client computing devices based on distances of the characteristic data among the plurality of client computing devices; and
classifying the plurality of client computing devices based on the centers among the plurality of client computing devices to obtain subsets of the plurality of client computing devices.

14. The system of claim 8, wherein the processor is further configured to perform operations comprising:
storing the local update from each of the plurality of client computing devices in a respective queue; and
retrieving the local update from the respective queue for the client computing device.

15. A computer program product comprising a computer readable storage medium having program instructions embodied therewith, the program instructions executable by a processor to cause the processor to perform operations, the operations comprising:
maintaining a plurality of queues for storing local updates;
receiving, by at least one server computing device, the local updates epoch by epoch for a current global model from a plurality of client computing devices, each local update being determined by one of the plurality of client computing devices based on a local dataset on the client computing device, wherein retrieving the local updates from the plurality of queues comprises:
removing a local update from the queue and storing the removed local update in a multi-version (MV) store as a historical version of the local update;
responsive to the plurality of queues being empty in the next epoch, retrieving a historical version of the local update from the MV store for model training;
determining, by the at least one server computing device, a domain-specific aggregate of the local updates from each subset of the plurality of client computing devices; and
determining, by the at least one server computing device, an updated global model based on the domain-specific aggregate of the local updates for each subset of the plurality of client computing devices.

16. The computer program product of claim 15, the operations further comprising:
receiving, by the at least one server computing device, further local updates for a first portion of the updated global model from a subset of the plurality of client computing devices, each further local update being determined by a respective one of the subset of client computing devices based on the local dataset on the respective client computing device; and
determining, by the at least one server computing device, a domain-specific model for the first subset of client computing devices by updating the first portion of the global model based on the further local updates.

17. The computer program product of claim 16, the instructions, when executed on a first client computing device among the first subset of client computing devices, causing the first client computing device to perform operations comprising:
determining a device-specific model for the first client computing device by updating a second portion of the domain-specific model based on the local dataset on the first client computing device.

18. The computer program product of claim 15, the operations further comprising:
obtaining, by the at least one server computing device, characteristic data representing the plurality of client computing devices; and
classifying, by the at least one server computing device, the plurality of client computing devices based on the characteristic data into a plurality of subsets of client computing devices.

19. The computer program product of claim 18, wherein classifying the plurality of client computing devices comprises:
reducing, by the at least one server computing device, a dimension of the characteristic data representing the plurality of client computing devices; and
classifying, by the at least one server computing device, the plurality of client computing devices based on the dimension-reduced characteristic data.

20. The computer program product of claim 15, wherein the operations further comprise at least one of:
storing, by the at least one server computing device, the local update from each of the plurality of client computing devices in a respective queue; and
retrieving, by the at least one server computing device, the local update from the respective queue for the client computing device.

* * * * *